United States Patent Office 2,932,988
Patented Apr. 19, 1960

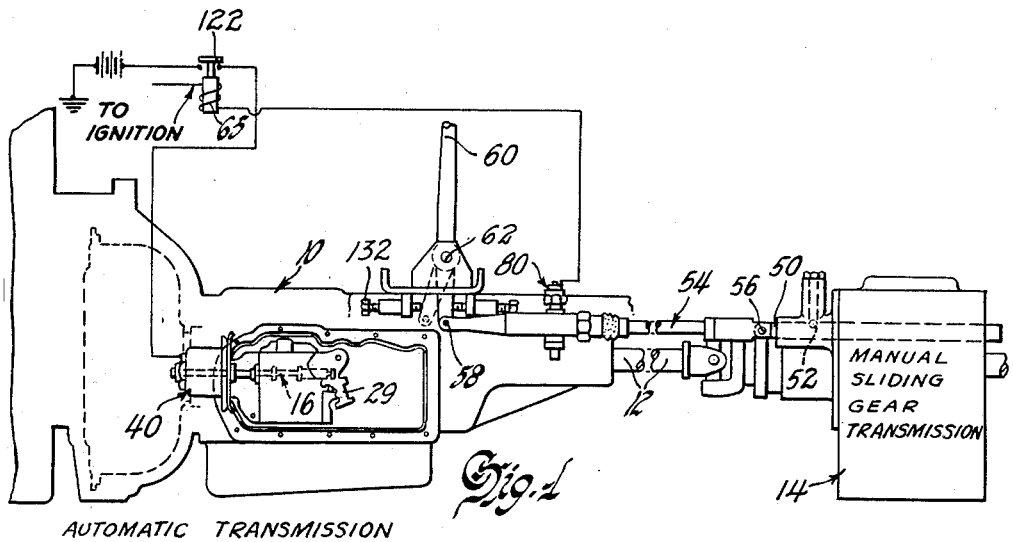
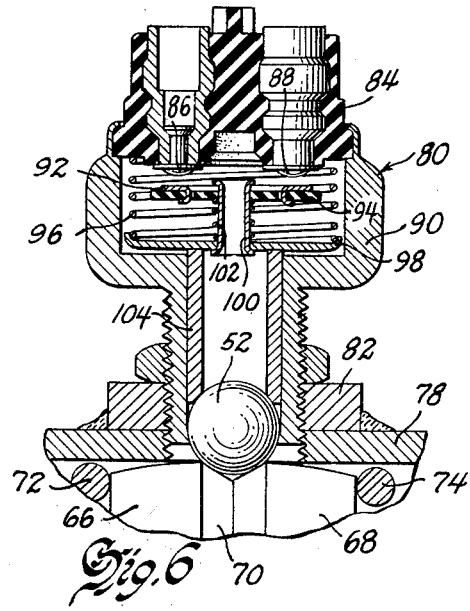

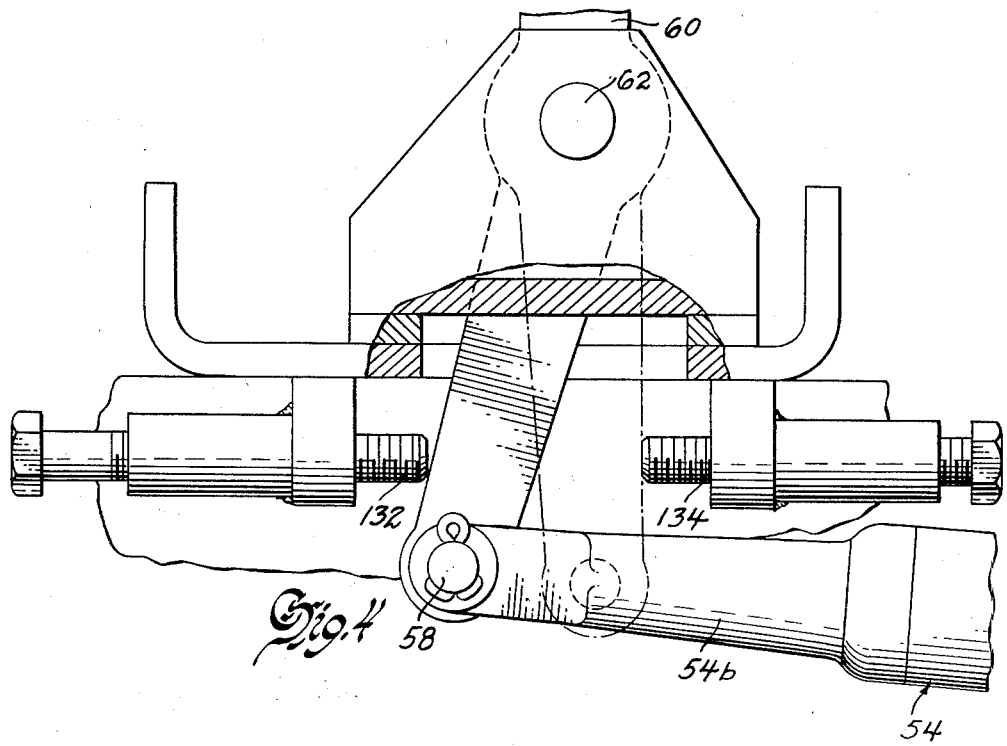
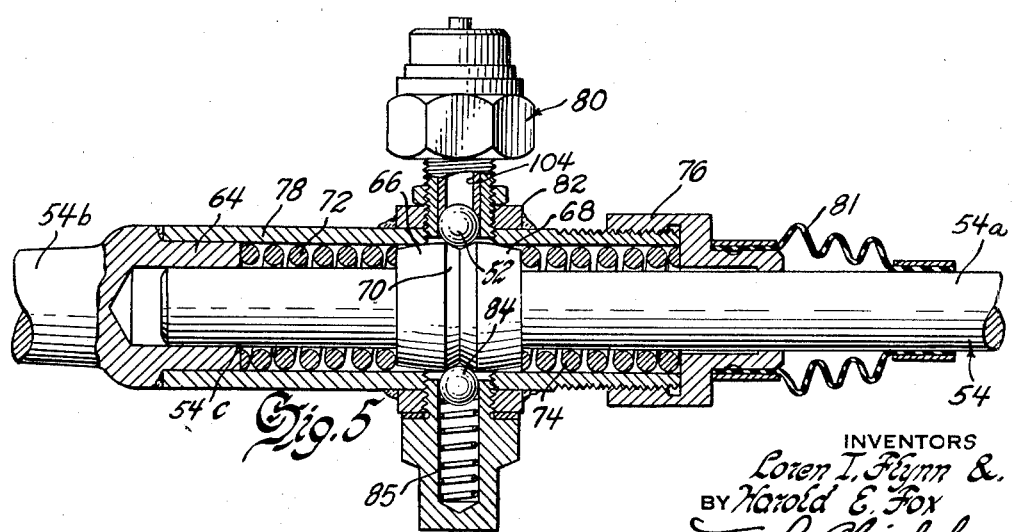

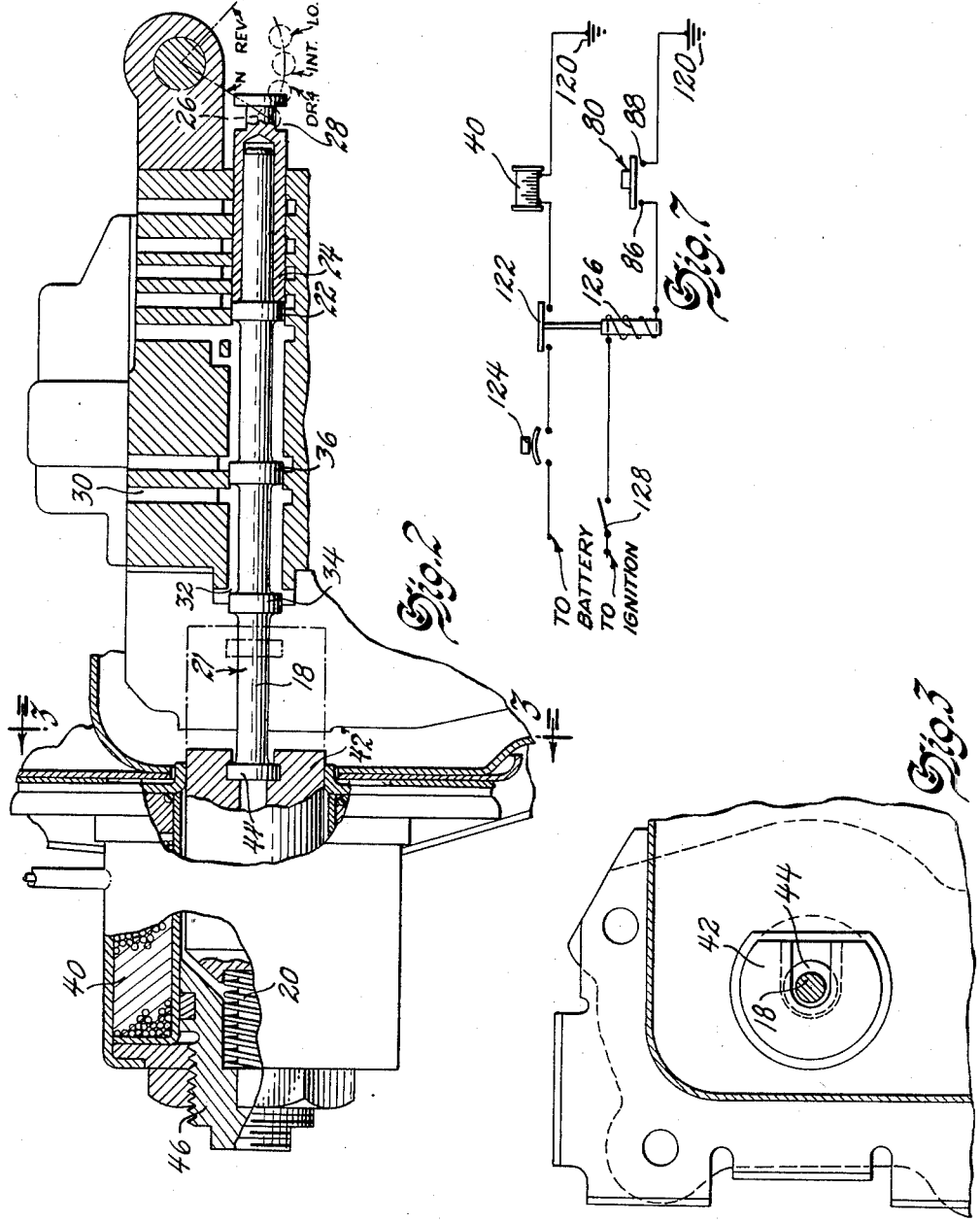

2,932,988

TRANSMISSION

Loren T. Flynn and Harold E. Fox, Pontiac, Mich., assignors to General Motors Corporation, Detroit, Mich., a corporation of Delaware Continuation of application Serial No. 399,503, December 21, 1953. This application August 27, 1956, Serial No. 606,516

45 Claims. (Cl. 74—745)

This invention relates to a drive system for vehicles or other loads having two transmissions in series, and to an arrangement for controlling the transmissions.

It has been proposed before this invention to drive a vehicle by two transmissions in series. One, usually the first or front transmission, changes torque ratios automatically, for example according to the load or speed or both. The other is shifted manually by the driver of the vehicle to multiply or change the effect on the final drive of the ratio in the first. The automatic establishment and maintaining of drive in the first transmission maintains torque on the second transmission and this creates problems in shifting the ratio in the second transmission. It is difficult or sometimes impossible to get the second transmission out of gear in making a shift and after it is out of gear and is in neutral, it is difficult and sometimes impossible to get the second transmission into another gear, even where synchronizing transmissions are use for the second unit. In heavy vehicles in particular, wear on the synchronizing devices is too rapid to be practical.

Our invention has for its objectives the elimination of the difficulties experienced in such systems heretofore proposed. We want to place the first transmission in neutral in order to interrupt the torque whenever the second transmission is to be shifted so that the drive through the second transmission can easily be disengaged and reestablished in another gear ratio. This is especially important where the second transmission is of the sliding gear type. Particularly, we want to provide a control system for both transmissions in which the second transmission can be shifted manually whenever desired and which automatically puts the first transmission into neutral upon starting to shift the second and automatically returns the first transmission to drive condition when the shift in the second has been completed. In addition, in some circumstances in order to assist synchronising, we want to return the first transmission to drive condition momentarily during the shifting of the second transmission, that is while the second transmission is in neutral between two successive gear ratios, and to put the first transmission in neutral a second time and subsequently return it to drive a second time while the shift in the second transmission is being completed by passing from neutral to the newly selected drive condition. We also want to return the automatic transmission to the particular drive ratio in which it was before the shift in the manual transmission was started. Also, we prefer to have in the automatic transmission means for selectively establishing drive ranges by stopping the automatic succession of ratios at some particular ratio. When we do this we want so to control the automatic transmission that when it is returned to drive after being in neutral, it is conditioned for the particular drive range established before the shift in the manual transmission was started.

We prefer to accomplish these objects by an electrical control system put into operation by relative movement between a shifting device such as a shift rail in the second transmission and an actuator such as a gear shift lever for the shifting device.

These and other objects and advantages of our invention will be apparent from the following description and claims and from the accompanying drawings, in which:

Fig. 1 is a schematic illustration of a manually shiftable transmission driven by an automatically shiftable transmission embodying one form of the invention, Fig. 2 is a view partly in elevation and partly in section of a control valve for the automatic transmission having a solenoid to position the valve in neutral, Fig. 3 is a section on line 3—3 of Fig. 2, Fig. 4 is an enlarged view partly in section and partly in elevation of adjustable stop means for preventing inadvertent placing of the first transmission in neutral, Fig. 5 is an enlarged view partly in section and partly in elevation of a portion of the control shown in Fig. 1 illustration the lost-motion connection between the shifter for the rear unit and the actuator for the shifter, Fig. 6 is a section of one form of switch for operating the solenoid of Fig. 2, and Fig. 7 is a schematic diagram of one form of electrical control system for the transmissions.

In Fig. 1 an automatic multi-speed transmission 10, having the usual input member driven by any suitable means, multiplies the torque transmitted by the input, at a variety of ratios selectively and transmits such multiplied torque to the usual output which drives an intermediate shaft 12 which drives a manually shiftable multi-speed transmission 14 which drives any suitable load, such as a vehicle. The front or first transmission 10 may be of any suitable form, as known in the art and as exemplified by the patents of Thompson 2,204,872 issued June 18, 1940; Kelley 2,211,233 issued August 13, 1940, and Carnegie 2,221,393 issued Nov. 12, 1940. This transmission may be controlled by a system as shown in the U.S. Patent 2,761,328 of Walter B. Herndon, Kenneth E. Snyder and Frank J. Condon. The drive range selector valve 110 of that patent may be replaced by the drive range selector valve 16 of Figs. 1 and 2 herein, which includes a valve stem 18 constantly urged to the right as Fig. 2 is seen by a spring 20 to place a land 22 against an adjustable stop 24 which may conveniently be in the form of a tube surrounding the end of the stem. The stop may be positioned in any desired position by a pin 26 in a groove 28 (Fig. 2). The pin is mounted on a manually operable arm 29, as shown in Fig. 1, by which it is movable to the positions marked N, DR4, INT, LO, and REV in Fig. 2 by any suitable linkage, not shown, connecting arm 29 to a selector lever in the driver's compartment of the vehicle as more fully disclosed in the Patent 2,761,328 referred to, and more specifically as shown in the Carnegie patent referred to. When the pin 26 is in the position marked N the spring 20 holds the valve 18 against the stop 24 in the position shown in Fig. 2, and the front transmission 10 is in neutral and cannot drive because the control pressure necessary to establish drive is vented from conduit 30 to exhaust port 32 by the groove between the lands 34 and 36. When the pin is in any other position than the position shown in Fig. 2 the spring 20 pushes the valve stem 16 to the right against the stop in a position in which the land 34 closes the exhaust port 32 and the land 36 connects the pressure supply conduit 30 to mechanism which establishes drive in the automatic transmission 10. When the pin is in the position marked DR4 in Fig. 2 the valve 18 is held by spring 20 in a position to establish automatically a series of four speed ratios; when the pin is in the position marked INT in Fig. 2 the valve 18 is held by the spring 20 in such a position that only three of the four ratios can be established; when the pin is in the position marked LO only two of the speed ratios can be established, and when the pin is in the position marked REV it establishes a single reverse ratio.

At any time the valve may be moved to neutral position, shown in Fig. 2 against the force of the spring by a solenoid having a winding 40 surrounding an armature 42 to which the valve stem is attached by a flange 44, the spring 20 being compressed between the armature and the frame 46 of the solenoid when the solenoid is energized, as explained below.

The intermediate shaft 12 driven by the automatic transmission 10 is the input shaft of the manually-shiftable transmission 14. This latter may be of any suitable type, but is preferably a sliding-gear transmission having synchronizing devices as is well known. It may provide two, three, four or five speeds, but is preferably a two-speed gear box arranged to provide direct drive and a reduced-speed ratio, although it may be arranged to provide direct drive and overdrive if desired. For purposes of illustration the transmission 14 is assumed to be a two-speed sliding gear synchronized transmission providing direct and a torque multiplying or reduced drive. These two ratios are established by a shift rail 50 which is reciprocable in the casing of the transmission 14 and is provided with a detent 52 to hold the shift rail 50 yieldably in any operative position selected by the driver. The position of the shift rail 50 conditions the transmission 14 for neutral, direct or reduction drive. The shift rail is positioned by a link generally designated by reference character 54 in Figs. 1, 4 and 5, connected at one end to the shift rail by a pin 56 and connected at its other end by a pin 58 to a manually-operated shift lever 60 mounted on a pivot 62. When the lever 60 is in the position shown in solid lines in Fig. 1 the link 54 positions shift rail 50 to establish direct drive in the transmission 14, and when moved to the dotted-line position it establishes reduction drive. Neutral is established when the lever 60 is in a position between the full lines and dotted lines.

As shown in Fig. 5 the link 54 is composed of two telescoping and relatively movable sections 54a and 54b. The end of the section 54b is formed into a socket 64 in which the end of the section 54a can slide. A cam member, which includes two cams 66 and 68 separated by a groove 70 is secured to the section 54a, and this section is constantly urged out of the socket 64 by a spring 72 compressed between the cams and the end of the socket, and is constantly urged into the socket by a spring 74 compressed between the cams and an adjustable end cap 76 threaded on a sleeve 78 welded to the section 54b. The springs are normally balanced and hold the section 54a with the cam centered in the sleeve 78. A flexible boot 81 may be secured to the cap 76 and rod 54a to keep out dirt.

A solenoid switch designated as a whole by 80 is threaded into a nut 82 welded around an opening in the tube 78 in such a position that the center of the nut is opposite the groove 70 between the cams 66 and 68 when the system is at rest without restraint and the springs 72 and 74 balance each other. The rods 54a and 54b can also be resiliently held in their normal or centered position by a detent having a ball 84 urged by a spring 85 into groove 70.

Fig. 6 shows one form of mechanism constituting switch 80. An insulating base 84, carrying fixed contacts 86 and 88 is attached to a cup 90 having a shank threaded into the nut 82. The contacts 86, 88 may be connected by a movable contact 92 carried on an insulating disk 94 normally held away from the stationary contacts by a spring 96 which urges downward a disk 98 carrying a rivet 100 passing loosely through the insulating disk which latter is urged toward the top of the rivet by a second spring 102. When the disk 98 is down as far as it will go the rivet holds the contact 92 away from contacts 86, 88. The disk 98 may be moved up against the force of spring 96 to close the contacts by a tube 104, resting against a ball 106 which acts as a cam follower, bearing against the cams 66, 68. When the link sections 54a, 54b are in their normal position shown in Fig. 5 the ball 106 rests in groove 70 and the switch is open. Upon any relative movement of link sections 54a and 54b the ball is forced up by either cam 66 or 68 to close the switch. Resilient and secure contact is assured by the spring 102 which, as the ball 106 and disk 98 move upward, first seats the contact 92 on contacts 86, 88 and thereafter presses the contacts together more firmly as the ball continues to move up and compress spring 102.

One way of controlling the solenoid winding 40 is shown in Figs. 1 and 7. The solenoid is connected between a ground connection 120 and one side of a normally open switch 122, the other side of which is connected to a normally closed switch or circuit breaker 124 which is connected to the battery. The switch 122 may be closed by a coil 126, which is connected in series with the ignition switch 128 and can be connected through the switch 80 to the ground 120. Whenever the switch 80 is closed the coil 126 closes switch 122 to energize the solenoid 40 to put the valve 18 in neutral position provided the ignition switch 128 is closed.

*Operation*

Assume that the car is being driven with the rear transmission in direct drive and that the rear transmission is to be shifted to low speed ratio. The shift lever 60 is moved from full line position of Fig. 1 toward the dotted-line position, and this starting of the shift moves link section 54b to neutralize the front transmission before any change in ratio in the rear transmission 14 can be made. This is accomplished in the following manner: The clutch teeth resist separation if torque is on them, as is well known. In any event the detent 52 holds the shift rail 50 to prevent movement of link section 54a while link section 54b is being moved by the shift lever 60. This compresses spring 74 and causes ball 106 to be raised by cam 66 to close the switch to establish neutral in the front transmission 10 in response to starting to shift the rear transmission. This relieves torque on the rear transmission 14 and the compressed spring 74 moves the rail section 54a to the left as Fig. 5 is seen, to take the rear transmission out of direct drive, putting it in neutral. This movement of the shift rail also restores the normal relative positions of link sections 54a and 54b to center the ball 106 in the groove 70 to open the switch 80 to restore drive in the front transmission after the rear transmission is in neutral. This causes the front transmission to drive the intermediate shaft 12 again. Continued movement of shift lever 60 toward the dotted-line position will move shift rail 50 toward the position in which it establishes the low ratio in the rear transmission until resistance to movement of the shift rail is brought about by engagement of the synchronizers (not shown) which resistance again causes relative movement of link section 54b with respect to 54a which again causes ball 106 to be raised by cam 66 to close the switch 80 and again put the front transmission in neutral. This is a momentary action which occurs while drive is being reestablished in the low ratio in the rear transmission 14. This second neutralizing of the front transmission again prevents torque from being applied to the rear transmission, and facilitates the establishment of drive in the low ratio. Upon completion of the shift to the new (low) drive ratio in the rear unit 14, the centering springs 72 and 74 again position the cams 66, 68 to permit the switch 80 to open and again restore drive in the front transmission. This drives the vehicle.

Shift from low to direct in the rear transmission operates similarly, but in reverse order, the cam 68 moving the switch instead of cam 66.

The action whereby momentary re-establishment of torque through front transmission 10 is accomplished when the rear transmission 14 is being shifted from one drive ratio to another (the rear transmission being in a neutral or no-drive condition of operation because of the position of its internal mechanism at this instant) is of a definite advantage in that it permits the intermediate shaft 12 to be speeded up or slowed down (as the case may be) so that the shafts being synchronized will be rotated at more nearly the same speed than would be the case were this momentary re-establishment of torque in the front transmission not provided for. This action may be compared to double clutching in a manually shifted transmission, but is accomplished automatically. It will readily be understood that this action reduces wear on the synchronizers because it reduces the work that would otherwise be required of the synchronizers and provides for more rapid shifting of drive ratio in the rear transmission.

It will be noted that the position of the pin 26 determines the highest speed ratio which can be achieved by the automatic transmission 10; that the first relative motion between the rods 54a and 54b in shifting the rear transmission 14, moves valve 18 from the position determined by the pin 26 to neutral and that upon the next successive relative movement between rods 54a and 54b the switch is opened and the valve 18 is returned by the spring 18 to the position it had before the shift in the rear unit was started.

Since any relative movement between link sections 54a and 54b from the normal centered position will place the front transmission in neutral, it is an object of the invention to prevent such relative movement by inadvertent pressing gear shift lever 60 in the direction to establish a ratio which has already been established in the rear transmission 14. Accordingly, we provide adjustable stops 132 and 134 which prevent continued or repeated movement of link section 54b after a shift has been completed. After drive has become established in the rear transmission the springs 72 and 74 center the rods 54a and 54b. Thereafter, the only motion possible in the shift lever 60 is deliberate and in the opposite direction to change the ratio. Any inadvertent attempt to move the rod in the same direction is prevented by the stop.

One of the objects of the invention is to provide safety means for restoring drive in the front transmission if any contacts in the electrical system should stick closed to energize the solenoid 40. To this end coil 126 of relay 122 is in series with the ignition circuit so that coil 126 may be deenergized by turning off the engine ignition switch 128 in the event that switch 80 should accidentally remain in its neutral (closed) position. By turning off the vehicle ignition, drive through the automatic transmission 10 can be re-established for engine braking, as in descending a hill, even though switch 80 should accidentally remain closed after shift of drive ratio in transmission 14. The safety relay 124 is provided between the vehicle battery and relay 122 to break the supply of battery current to solenoid coil 40 in the event that relay 122 should accidentally remain closed, as might be caused by a sticky relay. This safety relay 124 may be a reset type circuit breaker operable by the vehicle operator and positioned within his easy reach, or may be a time delay circuit breaker effective to break the circuit after solenoid 40 has been energized for a predetermined period of time. The safety devices prevent vehicle runaway down hill and permit drive to be re-established in the event that either switch 80 or relay 122 become accidentally stuck closed.

We claim:

1. The combination of a first transmission, a second transmission adapted to be driven by the first, the first transmission including torque transmitting means having a plurality of drive conditions which transmit torque at different speed ratios and a neutral condition which cannot transmit torque, the second transmission including change-speed gearing, means for changing the ratio of the gearing, and means responsive to changing the ratio of the gearing when the first transmission is in any drive condition for automatically first establishing neutral and subsequently restoring drive in the first transmission.

2. The combination of a first transmission, a second transmission adapted to be driven by the first, the first transmission including torque transmitting means having a drive condition which transmits torque and a neutral condition which cannot transmit torque, the second transmission including change-speed gearing having a plurality of drive ratios and a neutral condition, means operable when the first transmission is in drive condition for initiating a change from a first ratio to a second ratio and for establishing neutral between the establishment of different ratios in the second transmission, and means responsive to changing the ratio in the second transmission for automatically performing the following sequence of operations, namely first establishing neutral in the first transmission, then establishing drive in the first transmission in response to the establishment of neutral in the second transmission, then establishing neutral in the first transmission, and finally establishing drive in the first transmission in response to establishment of the second ratio in the second transmission.

3. The combination of a first transmission, a second transmission adapted to be driven by the first, the first transmission including torque transmitting means having a plurality of drive conditions which transmit torque at different speed ratios and a neutral condition which cannot transmit torque, the second transmission including change-speed gearing, having a plurality of drive ratios and a neutral condition, means operable when the first transmission is in any one drive condition for changing the drive ratio and for establishing neutral between the establishment of different ratios in the second transmission and means responsive to changing the ratio in the second transmission for automatically first establishing neutral in the first transmission then establishing said one drive condition in the first transmission when neutral is established in the second transmission, then establishing neutral in the first transmission, and finally establishing said one drive condition in the first transmission.

4. The combination of a first transmission, a second transmission adapted to be driven by the first, the first transmission including torque transmitting means having a plurality of drive conditions which transmit torque at different speed ratios and a neutral condition which cannot transmit torque, the second transmission including change-speed gearing, means for changing the ratio of the gearing, and means responsive to initiation of changing the ratio of the gearing when the first transmission is in drive condition for automatically establishing neutral in the first transmission.

5. The combination of a first transmission, a second transmission adapted to be driven by the first transmission, the first transmission having a plurality of drive conditions which transmit torque at different speed ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, and means responsive to relative movement between the actuator and the shifter of the second transmission for moving the control means of the first transmission from one of its said positions to the other.

6. The combination of a first transmission, a second transmission adapted to be driven by the first transmission, the first transmission having a plurality of drive conditions which transmit torque at different speed ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, and means responsive to a first relative movement between the actuator and the shifter of the second transmission for moving the control means of the first transmission from one of its positions to the other, said last-named means being responsive to a second and successive relative movement between the actuator and the shifter for moving the control means from said other of its positions to said one of its positions.

7. The combination of a first transmission, a second transmission adapted to be driven by the first transmission, the first transmission having a drive condition which transmits torque and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith and adapted to move the shifter, means for resisting movement of the shifter so that continuous uni-directional movement of the actuator moves the shifter in a succession of steps in the same direction, producing a succession of relative movements between the actuator and the shifter, and means responsive to the first relative movement between the actuator and the shifter of the second transmission for moving the control means of the first transmission in one direction between its two positions and responsive to each successive relative movement to move the control means between its two positions in the direction opposite to the direction of movement effected by the preceding relative movement of the actuator and shifter.

8. The combination of a first transmission, a second transmission adapted to be driven by the first transmission, the first transmission having a plurality of drive conditions which transmit torque at different speed ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost motion connection therewith and means responsive to movement of the actuator in starting to change the ratio in the second transmission for actuating the control means to establish neutral in the first transmission.

9. The combination of a first transmission, a second transmission adapted to be driven by the first transmission, the first transmission having a plurality of drive conditions which transmit torque at different speed ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, electromagnetic means for positioning the control means to establish neutral in the first transmission, and means responsive to movement of the actuator in starting to change the ratio of the second transmission for energizing the electromagnetic means.

10. The combination of a first transmission, a second transmission adapted to be driven by the first transmission, the first transmission having a plurality of drive conditions which transmit torque at different ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, resilient means for urging the actuator and shifter into a given position relative to each other, and means responsive to relative movement of the actuator and shifter from the given position for actuating the control means to establish neutral in the first transmission.

11. The combination of a first transmission, a second transmission adapted to be driven by the first transmission, the first transmission having a plurality of drive conditions which transmit torque at different ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, resilient means for urging the actuator and shifter into a given position relative to each other, and means responsive to relative movement of the actuator and shifter from the given position for actuating the control means to establish neutral in the first transmission and responsive to restoring the given relative position of the actuator and shifter for actuating the control means to establish drive in the first transmission.

12. The combination of a first transmission adapted to drive a second transmission, the first transmission including a change-speed torque transmitting means having a plurality of drive conditions which transmit torque to the second transmission at different speed ratios and a neutral condition which cannot transmit torque, control means having a neutral position and having a plurality of drive positions each adapted to establish one of the drive ratios in the first transmission, the second transmission including change-speed gearing, means for changing the ratio of the gearing and means responsive to changing the ratio for moving the control means first from any one drive position to neutral position then back to said one drive position.

13. The combination of a first transmission adapted to drive a second transmission, the first transmission including a change-speed torque transmitting means having a plurality of drive conditions which transmit torque to the second transmission at different speed ratios and a neutral condition which cannot transmit torque, the second transmission including change-speed gearing, means for changing the ratio of the gearing and means responsive to changing the ratio for first disestablishing any one drive condition and establishing neutral in the first transmission and then re-establishing said one drive condition.

14. The combination of a first transmission adapted to drive a second transmission, the first transmission including a change-speed torque transmitting means having a plurality of drive conditions which transmit torque to the second transmission at different speed ratios and a neutral condition which cannot transmit torque, a movable control member adapted to be placed in a position establishing neutral and in a plurality of positions establishing drive at different speed ratios, means constantly urging the control member away from neutral position, a stop adapted selectively to hold the control member in the several drive positions against the force of the urging means, the second transmission including change-speed gearing, means for changing the ratio of the gearing, and means responsive to changing the ratio of the second transmission for moving the control member to neutral position against the force of the urging means.

15. The combination of a first transmission adapted to drive a second transmission, the first transmission including a change-speed torque transmitting means having a plurality of drive conditions which transmit torque to the second transmission at different speed ratios and a neutral condition which cannot transmit torque, a movable control member adapted to be placed in a position establishing neutral and in a plurality of positions establishing drive at different speed ratios, means constantly urging the control member away from neutral position, a stop adapted selectively to hold the control member in the several drive positions against the force of the urging means, the second transmission including change-speed gearing, means for changing the ratio of the gearing and means responsive to changing the ratio of the second transmission for moving the control member to neutral position against the force of the urging means and subsequently releasing the control member to be moved by the urging means against the stop.

16. The combination of a first transmission adapted to drive a second transmission, the first transmission including a change-speed torque transmitting means having a plurality of drive conditions which transmit torque to the second transmission at different speed ratios and a neutral condition which cannot transmit torque, a movable control member adapted to be placed in a position establishing neutral and in a plurality of positions establishing drive at different speed ratios, means constantly urging the control member away from neutral position, a stop adapted selectively to hold the control member in the several drive positions against the force of the urging means the second transmission including change-speed gearing, means for changing the ratio of the gearing and means responsive to changing the ratio of the second transmission for first moving the control member to neutral position against the force of the urging means, second releasing the control member to be moved by the urging means against the stop, third moving the control member again to neutral position against the force of the urging means, and fourth releasing the control member to be moved by the urging means against the stop.

17. The combination of a first transmission adapted to drive a second transmission, the first transmission including change-speed torque transmitting means havng a drive condition which transmits torque and a neutral condition which transmits no torque and including control means for selectively establishing drive and neutral in the first transmission, the second transmission including two drive ratios and a neutral condition, means for selectively establishing neutral and either of the drive ratios in the second transmission, and means responsive to starting to change the ratio of the second transmission for actuating the control means to establish neutral in the first transmission and responsive to establishing neutral in the second transmission for actuating the control means to establish drive in the first transmission.

18. The combination of a first transmission adapted to drive a second transmission, the first transmission including change-speed torque transmitting means having a plurality of drive conditions which transmit torque at different ratios and a neutral condition which transmits no torque and including control means for selectively establishing any one of said drive conditions and neutral in the first transmission, the second transmission including a plurality of drive ratios, means for selectively establishing the drive ratios in the second transmission, and means responsive to starting to change the ratio of the second transmission for actuating the control means to establish neutral in the first transmission and responsive to completion of change of ratio in the second transmission for actuating the control means to establish drive in the first transmission.

19. The combination of a first transmission, a second transmission adapted to be driven by the first transmission, the first transmission having a plurality of drive conditions which transmit torque at different ratios and a neutral condition which cannot transmit torque, control means adapted when in one position to establish drive and adapted when in another position to establish neutral in the first transmission, the second transmission including change-speed gearing, a shifter for the second transmission having a range of movement between two extreme positions and adapted when in each extreme position to establish drive through the second transmission, means yieldably holding the shifter in each extreme position, an actuator for the shifter having a lost-motion connection therewith, and means responsive to relative movement between the actuator and the shifter of the second transmission for moving the control means of the first transmission from one of its positions to the other.

20. The combination of a first transmission, a second transmission adapted to be driven by the first transmission, the first transmission having a drive condition which transmits torque and a neutral condition which cannot transmit torque, the second transmission including change-speed gearing, a shifter for changing the ratio of the gearing in the second transmission, an actuator for the shifter having a lost-motion connection therewith, a spring urging the shifter in one direction with respect to the actuator, a second spring urging the shifter in the opposite direction with respect to the actuator, and means responsive to balance of the springs for establishing drive in the first transmission.

21. The combination of a first transmission, a second transmission adapted to be driven by the first transmission, the first transmission having a drive condition which transmits torque and a neutral condition which cannot transmit torque, the second transmission including change-speed gearing, a shifter for changing the ratio of the gearing in the second transmission, an actuator for the shifter having a lost-motion connection therewith, a spring urging the shifter in one direction with respect to the actuator, a second spring urging the shifter in the opposite direction with respect to the actuator, and means responsive to imbalance of the springs for establishing neutral in the first transmission.

22. The combination of a first transmission, a second transmission adapted to be driven by the first transmission, the first transmission having a drive condition which transmits torque and a neutral condition which cannot transmit torque, control means adapted in one position to establish drive and in another position to establish neutral in the first transmission, the second transmission including change-speed gearing, a shifter for changing the ratio of the gearing in the second transmission, an actuator for the shifter having a lost-motion connection therewith, a spring urging the shifter in one direction with respect to the actuator, a second spring urging the shifter in the opposite direction with respect to the actuator, a cam means and cam follower means, one of said last-mentioned two means being secured to the actuator and the other of said last-mentioned two means being secured to the shifter, and means responsive to movement of the cam follower for moving the control means from one of its positions to the other.

23. The combination of a first transmission, a second transmission adapted to be driven by the first transmission, the first transmission having a drive condition which transmits torque and a neutral condition which cannot transmit torque, a control adapted in one position to establish drive and in another position to establish torque in the first transmission, the second transmission including change-speed gearing, shifter means for changing the ratio of the gearing, actuator means for the shifter means, a pair of separated cams fixed to one means, a cam follower on the other means, a pair of springs urging said means to move in opposite directions relative to each other, the cam follower being disposed between the cams when the springs are in balance, and means responsive to movement of the cam follower with reference to either cam for moving the control of the first transmission from one of its positions to the other.

24. The combination of a multi-speed first transmission, a multi-speed second transmission adapted to be driven by the first, the first transmission having a neutral condition which cannot transmit torque, means for changing the speed ratio of the second transmission, and means responsive to changing the ratio of the second transmission when the first transmission is conditioned to drive in one of its speed ratios for automatically first establishing neutral in the first transmission and subsequently restoring drive in said one speed ratio in the first transmission.

25. The combination of a first transmission having an input and an output and which increases the torque of the input by a plurality of ratios selectively, a second multi-speed transmission having an input adapted to be driven by the output of the first, the first transmission having a neutral condition which cannot drive, the second transmission being of the sliding-gear type, a reciprocable gear shifting means for the second transmission, the movement of such gear shifting means having a linear component in the direction of the length of the gear shifting means and means responsive to initial linear movement of the gear shifting means when the first transmission is in drive condition for automatically establishing neutral in the first transmission.

26. The combination of a first transmission, a second transmission adapted to be driven by the first, the first transmission including torque transmitting means having a plurality of drive conditions which transmit torque at different limiting speed ratios and a neutral condition which cannot transmit torque, the second transmission including change-speed gearing, means for changing the ratio of the gearing, and means responsive to changing the ratio of the gearing when the first transmission is in any one drive condition for automatically first establishing neutral and subsequently restoring said one drive condition in the first transmission.

27. The combination of a first transmission, a second transmission driven by the first, the first transmission including means for transmitting torque at a plurality of speed ratios and having a neutral condition which cannot transmit torque, control means adapted selectively to establish the neutral condition and to establish the speed ratios progressively and automatically, means for establishing a plurality of control conditions, each of which control conditions establishes a limiting speed ratio in the series of progressively establishable speed ratios, means for changing the ratio of the gearing in the second transmission, and means responsive to changing the ratio when the first transmission is in any one control condition for automatically first establishing neutral in the first transmission and subsequently restoring said one control condition.

28. The combination of a first transmission, a second transmission adapted to be driven by the first transmission, the first transmission having a plurality of drive conditions which transmit torque at different speed ratios and a neutral condition which cannot transmit torque, control means adapted when in one position to establish drive and adapted when in another position to establish neutral in the first transmission, the second transmission including change-speed gearing, a shifter for changing the ratio of the gearing in the second transmission, an actuator for the shifter having a lost-motion connection therewith, and means responsive to a first relative movement in one direction between the actuator and the shifter of the second transmission for moving the control means of the first transmission from one of its positions to the other, said last-named means being responsive to a second and successive relative movement in the same direction between the actuator and the shifter for moving the control means from said other of its positions to said one of its positions.

29. The combination of a first transmission adapted to drive a second transmission, the first transmission including a change-speed torque transmitting means having a plurality of drive conditions which transmit torque to the second transmission at a plurality of ratios of torque increase and a neutral condition which cannot transmit torque, control means having a neutral position and having a plurality of drive positions each adapted to establish one of the drive conditions in the first transmission, the second transmission including change-speed gearing, means for changing the ratio of the gearing and means responsive to changing the ratio for moving the control means first from any one drive position to neutral position then back to said one drive position.

30. In a control system for a pair of transmissions in series, the first transmission having a plurality of drive conditions which transmit torque at different speed ratios and a neutral condition which cannot transmit torque, the second transmission being adapted to drive selectively at a plurality of ratios, a valve for selecting any one of said drive conditions and neutral in the first transmission, manually operable shift mechanism for changing the drive ratio of the second transmission, and means controlled by said manually operable shift mechanism for positioning said valve to establish neutral in said first transmission during the interval in which change of drive ratio is accomplished in said second transmission.

31. In a control system for a pair of transmissions in series, the first transmission having a plurality of drive conditions which transmit torque at different speed ratios and a neutral condition which cannot transmit torque, the second transmission being adapted to drive selectively at a plurality of ratios, means for manually selecting drive and neutral in the first transmission, manually operable shift mechanism for selecting the drive ratio of the second transmission, means controlled by said shaft mechanism for momentarily establishing neutral in the first transmission unit during the interval in which drive ratio is being changed in said second transmission, and means effective to automatically re-establish drive in said first transmission unit upon completion of change of drive ratio in said second transmission.

32. In a control system for a pair of transmissions in series, the first transmission having a plurality of drive conditions which transmit torque at different speed ratios and a neutral condition which cannot transmit torque, the second transmission being adapted to drive selectively at a plurality of ratios, a valve for selecting any one of said drive conditions and neutral in the first transmission, manually operable shift mechanism for selecting the drive ratio of the second transmission, a solenoid operable when energized to position said valve to establish neutral in the first transmission, means urging said valve member from its neutral position to a position wherein drive is established in said first transmission when said solenoid is de-energized, and a switch for controlling said solenoid, said shift mechanism being effective to close said switch to energize said solenoid in the interval in which drive ratio is being changed in said second transmission and to permit said switch to open thereafter to de-energize said solenoid.

33. In a control system for a pair of transmissions in series, the first transmission having a plurality of drive conditions with transmit torque at different speed ratios and a neutral condition which cannot transmit torque, the second transmission being adapted to drive selectively at a plurality of ratios, a valve for selecting any one of said drive conditions and neutral in the first transmission, manually operable shift mechanism for selecting the drive ratio of the second transmission, a solenoid operable when energized to position said valve to establish neutral in said first transmission, means urging said valve member against the action of said solenoid, a relay operable to connect said solenoid to an electrical source when energized, a switch controlled by said shift mechanism for controlling said relay, said shift mechanism being effective to close said switch to energize said relay in the interval in which ratio is being changed in the second transmission and thereafter to open said switch to de-energize said relay.

34. In a control system for a pair of transmissions in series, the first transmission having a drive condition and a neutral condition, the second transmission being adapted to drive selectively at a plurality of ratios, a valve for selecting drive and neutral in the first transmission, shift mechanism for selecting the drive ratio of the second transmission, a solenoid operable when energized to position said valve to establish neutral in said first transmission, means urging said valve in opposition to the action of said solenoid to establish drive, a relay operable when energized to connect said solenoid to an electrical source, a switch in series with the vehicle engine ignition circuit for controlling said relay, said switch being controlled by said shift mechanism, said shift mechanism being effective to close said switch to energize said relay to connect said solenoid to said electrical source in the interval in which drive ratio is being changed in the second transmission.

35. In a control system for a pair of transmissions in series, the first transmission having a drive condition and a neutral condition, the second transmission being adapted to drive selectively at a plurality of ratios, a valve for selecting drive and neutral in the first transmission, shift mechanism for selecting the drive ratio of the second transmission, a solenoid operable when energized to position said valve to establish neutral in said first transmission, means for moving said valve to re-establish drive in the first transmission when said solenoid is de-energized, a relay operable when energized to connect said solenoid to an electrical source, a switch in series with the vehicle engine ignition circuit for controlling said relay, said switch being controlled by said shift mechanism, said shift mechanism being effective to close said switch in the interval in which drive ratio in said second transmission is being changed and to open said switch upon completion of change of drive ratio in said second transmission, said relay being de-energized when the ignition circuit is opened irrespective of the position of said switch.

36. In a control system for a pair of transmissions in series, the first transmission having a drive condition and a neutral condition, the second transmission being adapted to drive selectively at a plurality of ratios, a valve for selecting drive and neutral in the first transmission, manually operable shift mechanism for selecting the drive ratio of the second transmission, a solenoid operable when energized to position said valve to establish neutral in said first transmission, means for moving said valve to establish drive through the first transmission when said solenoid is de-energized, a relay operable to connect said solenoid to an electrical source when said relay is energized, a switch controlled by said shift mechanism for controlling said relay, said shift mechanism including a cam effective to close said switch in the interval in which drive ratio is being changed in the second transmission, and means operable automatically to position said cam to permit said switch to open upon completion of shift of drive ratio in the second transmission.

37. In a control system for a pair of transmissions in series, the first transmission having a drive condition and a neutral condition, the second transmission being adapted to drive selectively at a plurality of ratios, a valve for selecting drive and neutral in the first transmission, manually operable shift mechanism for selecting the drive ratio of the second transmission, a solenoid operable when energized to position said valve to establish neutral in the first transmission, means for moving said valve to establish drive through the first transmission when said solenoid is de-energized, a relay operable to connect said solenoid to an electrical source when said relay is energized, a switch controlled by said shift mechanism for controlling said relay, said shift mechanism including a pair of rod sections operatively connected to each other through a lost-motion connection, a cam carried by one of said rod sections effective to close said switch upon initiation of shift action by said shift mechanism, and spring means effective to automatically position said cam to open said switch upon completion of change of drive ratio in the second transmission.

38. In a control system for a pair of transmissions in series, the first transmission having a drive condition and a neutral condition, the second transmission being adapted to drive selectively at a plurality of ratios, a valve for selecting drive and neutral in the first transmission, manually operable shift mechanism for selecting the drive ratio of the second transmission, a solenoid operable when energized to position said valve to establish neutral in the first transmission, means for moving said valve to establish drive through the first transmission when said solenoid is de-energized, a relay operable to connect said solenoid to an electrical source when said relay is energized, a switch controlled by said shift mechanism for controlling said relay, said shift mechanism including a cam effective to close said switch during the interval in which drive ratio is being changed in the second transmission, means operable automatically to position said cam to permit said switch to open upon completion of shift of drive ratio in the second transmission, and stop means for limiting the permissible range of travel of said shift mechanism.

39. In a control system for a pair of transmissions in series, the first transmission having a drive condition and a neutral condition, the second transmission being adapted to drive selectively at a plurality of ratios, a valve for controlling the admission of fluid pressure to the first transmission, shift mechanism for changing the drive ratio in the second transmission, and means controlled by said shift mechanism for controlling said valve, said shift mechanism being effective to position said valve to prevent the supply of fluid pressure to said first transmission and thereafter to position said valve to supply fluid pressure to said first transmission as said shift mechanism is actuated to change the drive ratio of said second transmission.

40. In a control system for a pair of transmissions in series, the first transmission having a drive condition and a neutral condition, the second transmission being adapted to drive selectively at a plurality of ratios, a valve for controlling the supply of fluid pressure to the first transmission, shift mechanism for changing the drive ratio of the second transmission, and means controlled by said shift mechanism for controlling said valve, said shift mechanism being effective upon initial actuation thereof to position said valve to prevent the supply of fluid pressure to the first transmission, and thereafter to position said valve to momentarily direct fluid pressure to the first transmission, said shift mechanism being thereafter effective to position said valve to interrupt the supply of fluid pressure, and said shift mechanism being thereafter effective to position said valve to direct fluid pressure to the first transmission as said shift mechanism is actuated to change the drive ratio in said second transmission.

41. In a control system for a pair of transmissions in series, the first transmission having a drive condition and a neutral condition, the second transmission being adapted to drive selectively at a plurality of ratios, means for manually selecting drive and neutral in the first transmission, shift mechanism for changing the drive ratio of the second transmission, and means controlled by said shift mechanism for controlling said selecting means, said shift mechanism means being effective upon initial operation thereof in changing the drive ratio in said second transmission to establish neutral in the first transmission, said shift mechanism means being thereafter effective to establish momentary torque transfer through the first transmission, said shift mechanism being thereafter effective to momentarily establish neutral in said first transmission, and said shift mechanism being finally effective to reestablish torque transfer through the first transmission as shift of drive ratio is accomplished in said second transmission.

42. In a control system for a pair of transmissions in series, the first transmission having a plurality of drive conditions which transmit torque at different ratios and a neutral condition which cannot transmit torque, the second transmission being adapted to drive selectively at a plurality of ratios, control means for selecting any one of said drive conditions and neutral in the first transmission, manually operable shift mechanism for changing the drive ratio of the second transmission, and means actuated by said manual shift mechanism operable on said control means for establishing neutral in the first transmission in the interval in which drive ratio is being changed in the second transmission.

43. In a control system for a pair of transmissions in series, the first transmission having a plurality of drive conditions which transmit torque at different speed ratios and a neutral condition which cannot transmit torque, the second transmission being adapted to drive selectively at a plurality of ratios, means for selecting any one of said drive conditions and neutral in the first transmission, manually operable shift mechanism for changing the drive ratio of the second transmission, means controlled by said shift mechanism operable upon the control means for establishing neutral in the first transmission in the interval in which drive ratio is being changed in the second transmission, and means for automatically establishing drive in the first transmission upon completion of change of drive ratio in the second transmission.

44. In a control system for a pair of transmissions in series, the first transmission having a plurality of drive conditions which transmit torque at different speed ratios and a neutral condition which cannot transmit torque, the second transmission being adapted to drive selectively at a plurality of ratios, a valve for selecting any one of said drive conditions and neutral in the first transmission, manually operable shift mechanism for changing the drive ratio of the second transmission, and electrical means controlled by the shift mechanism for momentarily positioning the valve to establish neutral in the first transmission in the interval in which drive ratio is being changed in the second transmission.

45. In a control system for a pair of transmissions in series, the first transmission having a plurality of drive conditions which transmit torque at different speed ratios and a neutral condition which cannot transmit torque, the second transmission being adapted to drive selectively at a plurality of ratios, a valve for selecting any one of said drive conditions and neutral in the first transmission, manually operable shift mechanism for selecting the drive ratio for the second transmission, electrical means controlled by the shift mechanism for momentarily positioning the valve to establish neutral in the first transmission during the interval in which drive ratio in the second transmission is being changed and means for urging the valve to a position to establish drive in the first transmission upon completion of change of ratio in the second transmission.

References Cited in the file of this patent

UNITED STATES PATENTS

| | | |
|---|---|---|
| 1,805,120 | Von Erhardt | May 12, 1931 |
| 2,073,692 | Griswold | Mar. 16, 1937 |
| 2,104,061 | Surdy | Jan. 4, 1938 |
| 2,153,509 | Rockwell | Apr. 4, 1939 |
| 2,263,047 | Newton | Nov. 18, 1941 |
| 2,341,756 | Avila | Feb. 15, 1944 |